United States Patent
Eidus et al.

(10) Patent No.: US 8,244,957 B2
(45) Date of Patent: Aug. 14, 2012

(54) MECHANISM FOR DYNAMIC PLACEMENT OF VIRTUAL MACHINES DURING LIVE MIGRATION BASED ON MEMORY

(75) Inventors: Izik Eidus, Raanana (IL); Uri Lublin, Raanana (IL); Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 335 days.

(21) Appl. No.: 12/714,043

(22) Filed: Feb. 26, 2010

(65) Prior Publication Data

US 2011/0213911 A1 Sep. 1, 2011

(51) Int. Cl.
G06F 12/00 (2006.01)
(52) U.S. Cl. .............................. 711/6; 711/165; 711/216
(58) Field of Classification Search .............. 711/6, 165, 711/216
See application file for complete search history.

(56) References Cited

U.S. PATENT DOCUMENTS

| | | | |
|---|---|---|---|
| 8,140,812 B2* | 3/2012 | Arroyo et al. ................. | 711/170 |
| 2005/0268298 A1* | 12/2005 | Hunt et al. ........................ | 718/1 |
| 2011/0004735 A1* | 1/2011 | Arroyo et al. ................. | 711/162 |
| 2011/0131568 A1* | 6/2011 | Heim ................................. | 718/1 |

OTHER PUBLICATIONS

Galvin, Peter Baer, "VMware vSphere Vs. Microsoft Hyper-V: A Technical Analysis," Corporate Technologies, CTI Strategy White Paper, 2009, 32 Pages.
U.S. Appl. No. 12/419,256, Apr. 6, 2009, Frank.

* cited by examiner

*Primary Examiner* — John Lane
(74) *Attorney, Agent, or Firm* — Lowenstein Sandler PC

(57) ABSTRACT

A mechanism for dynamic placement of virtual machines (VMs) during live migration based on memory is disclosed. A method of embodiments of the invention includes determining candidate target host machines capable of receiving a VM to be migrated, obtaining a hash value for memory pages of the VM to be migrated, obtaining for each candidate target host machine hash values for shared memory pages utilized by one or more VMs hosted by the candidate target host machine, comparing for each candidate target host machine the hash values for the memory pages of the VM to be migrated with the hash values for the shared memory pages, and adjusting a score in a general selection algorithm for the candidate target host machine with the most identical matches of the hash values for the shared memory pages with the hash values for the memory pages of the VM to be migrated.

20 Claims, 4 Drawing Sheets

US 8,244,957 B2

MECHANISM FOR DYNAMIC PLACEMENT OF VIRTUAL MACHINES DURING LIVE MIGRATION BASED ON MEMORY

RELATED APPLICATION

The present application is related to co-filed U.S. patent application Ser. No. 12/714,033 entitled "Mechanism for Optimizing Initial Placement of Virtual Machines to Reduce Memory Consumption Based on Similar Characteristics", and co-filed U.S. patent application Ser. No. 12/714,053 entitled "Mechanism for Optimal Placement of Virtual Machines to Reduce Memory Consumption Based on Shared Images", which are both assigned to the assignee of the present application.

TECHNICAL FIELD

The embodiments of the invention relate generally to virtual machine (VM) systems and, more specifically, relate to dynamic placement of VMs during live migration based on memory.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

In a virtualization systems, it is important to schedule (also referred to as selection or placement) VMs on the "best host" for the job. There are various considerations that play into a selection algorithm for selecting the "best host". The selection algorithm is relevant for both placement of the VM at launch time, and for live migration of the VM to another host. Live migration may be due to user request, or due to a trigger by a load balancing process causing the need to select a new host for the VM.

VMs may run an operating system (OS) and processes with the same memory image as other VMs. In such a case, a host process may be used to optimize memory utilization on the host, by referencing identical memory pages from multiple VMs to the same single memory page. This is known as memory sharing. Memory sharing reduces the amount of memory required in the host when running VMs with shared memory.

Thus, a virtualization system would benefit from a host selection algorithm optimized to schedule VMs with high memory sharing on the same host.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
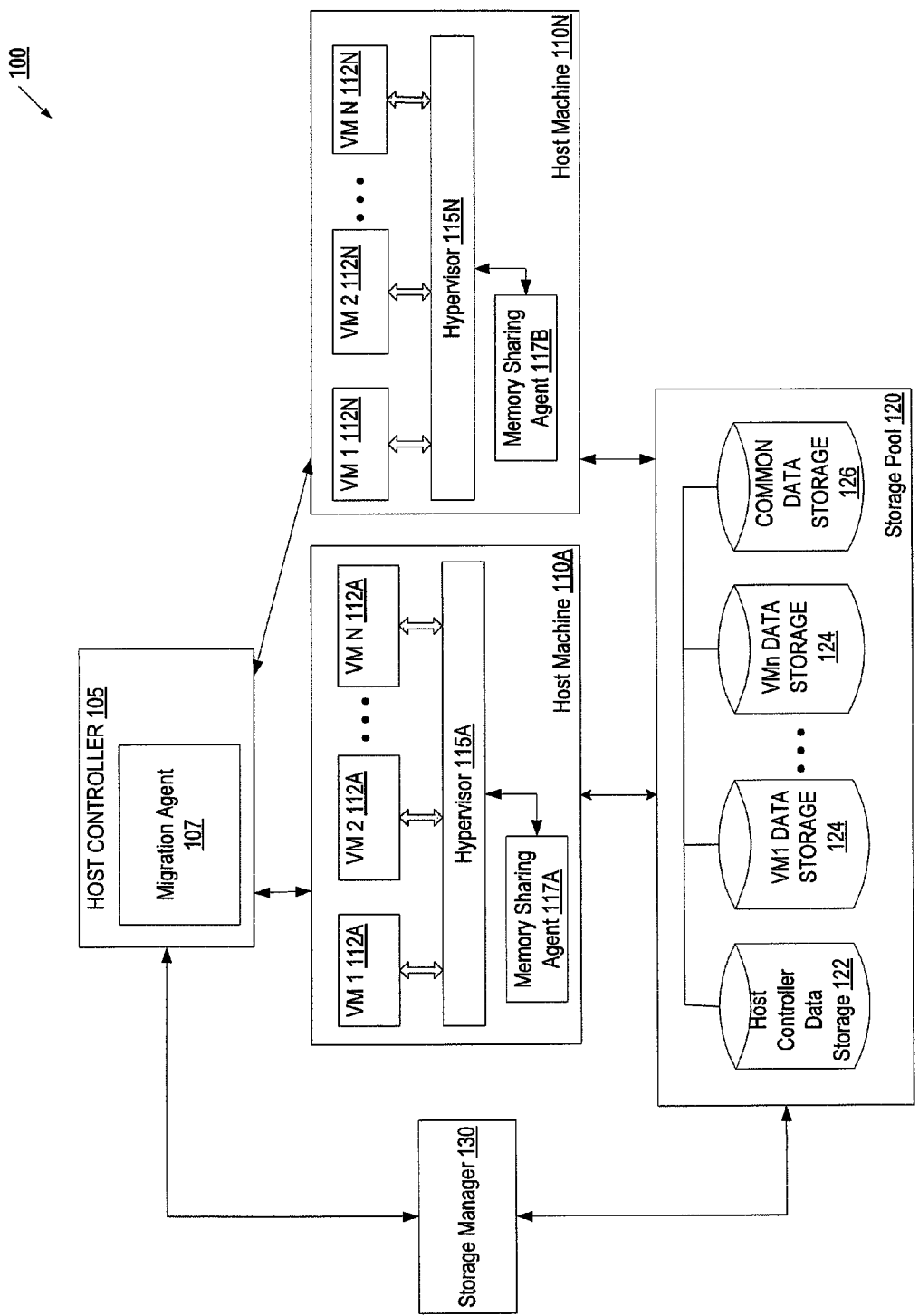
FIG. 1 is a block diagram of an exemplary virtualization architecture in which embodiments of the present invention may operate.

Embodiments of the invention provide a mechanism for dynamic placement of virtual machines (VMs) during live migration based on memory. A method of embodiments of the invention includes determining candidate target host machines capable of receiving a VM to be migrated, obtaining a hash value for memory pages of the VM to be migrated, obtaining for each candidate target host machine hash values for shared memory pages utilized by one or more VMs hosted by the candidate target host machine, comparing for each candidate target host machine the hash values for the memory pages of the VM to be migrated with the hash values for the shared memory pages, and adjusting a score in a general selection algorithm for the candidate target host machine with the most identical matches of the hash values for the shared memory pages with the hash values for the memory pages of the VM to be migrated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for dynamic placement of virtual machines (VMs) during live migration based on memory. Embodiments of the invention identify target host machines that have a significant number of identical memory pages to a migrating VM and utilize this determination as part of the host selection algorithm for placing the migrating VM. Specifically, embodiments of the invention utilize hash-based calculations in determining identical shared pages between a migrating VM and a candidate target host machine. Embodiments of the invention use the hash-based shared memory determination as an additional consideration in the general host selection algorithm for migration. Although embodiments of the invention refer to migration of a VM, one skilled in the art will appreciate that solutions provided in embodiments of the invention may apply equally to initial placement of a VM as well.

FIG. 1 illustrates an exemplary virtualization architecture 100 in which embodiments of the present invention may operate. The virtualization architecture 100 may include one or more host machines 110A, 110N to run one or more virtual machines (VMs) 112A, 112N. Each VM 112A, 112N runs a guest operating system (OS) that may be different from one another. The guest OS may include Microsoft Windows, Linux, Solaris, Mac OS, etc. The host 110A, 110N may include a hypervisor 115A, 115N that emulates the underlying hardware platform for the VMs 112A, 112N. The hypervisor 115A, 115N may also be known as a virtual machine monitor (VMM), a kernel-based hypervisor or a host operating system.

In one embodiment, each VM 112A, 112N may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110A, 110N as a local client. In one scenario, the VM 112A, 112N provides a virtual desktop for the client.

As illustrated, the host 110A, 110N may be coupled to a host controller 105 (via a network or directly). In some embodiments, the host controller 105 may reside on a designated computer system (e.g., a server computer, a desktop computer, etc.) or be part of the host machine 110A, 110N or another machine. The VMs 112A, 112N can be managed by the host controller 105, which may add a VM, delete a VM, balance the load on the server cluster, provide directory service to the VMs 131, and perform other management functions.

The host 110A, 110N may also be coupled to a data storage pool 120. Data storage pool 120 may represent multiple storage devices (e.g., disks in a disk array) or a single storage device (e.g., a hard drive of the host 110A, 110N or host controller 105). In one embodiment, the storage pool 120 includes storage areas 124 designated for individual VMs 112A, 112N. When a VM 112A, 112N is created, it is associated with its own individual data storage 124, which may be an independent storage device or a designated area of a single storage device. The host 110A, 110N may further be associated with common data storage 126 of the data storage pool 120, directly or remotely. Common data storage 126 may represent an independent storage device (e.g., a disk drive) or a remote storage device (e.g., network attached storage (NAS), etc.). Data storage pool 120 may also include areas 122 designated for use by the host controller 105, which may also be an independent storage device or a designated area of a single storage device. Although shown as a single storage pool, those skilled in the art will appreciate that data storage pool 120 may be multiple, independent storage devices in dispersed locations that are logically pooled together and managed by storage manager 130.

In one embodiment, host controller 105 may include a migration agent 107 that is responsible for making a determination of which host machine 110A, 110N to place a VM 112A, 112N when it is migrated. In a virtualization system it is important to schedule (also referred to as selection or placement) VMs on the "best host" for the job. There are various considerations for selecting the "best host". In one embodiment, migration agent 107 utilizes a general selection algorithm that considers a variety of factors for placement of a VM.

Typically, a general selection algorithm includes a process that scans for relevant hosts 110A, 110N that can launch a VM and provide all required resources for the VM, such as access to relevant storage and logical networks. The hosts 110A, 110N that satisfy these requirements are known as candidate hosts. A general selection algorithm may also include checks against exclusion criteria, which are a set of requirements that would not allow the VM to run on a certain host, thus removing that host from the list of candidate hosts for selection. A general selection algorithm also includes comparison ordering to sort the remaining candidate hosts by means of a score (or any other type of transitive order) that will identify the best host. In one embodiment, the score is a numeric representation of the preference given to a candidate host for selection by the algorithm, where a higher score is equivalent to a higher preference and the candidate with the highest score is selected for the placement.

In many cases, a VM 112A, 112N may run an OS and processes that utilize the same memory image as other VMs. In such cases, a process of the host machine 110A, 110N may be used to optimize memory utilization on the host, by referencing identical memory pages from multiple VMs to the same single memory page. This is known as memory sharing. In one embodiment, each host 110A, 110N includes a memory sharing agent 117A, 117N that operates to unify shared pages of VMs 112A, 112N running on that host 110A, 110N. In one embodiment, the memory sharing agent 117A, 117N is a Kernel SamePage Merging (KSM) feature of a Linux kernel running in host machine 110A, 110N. Instead of each VM 112A, 112N storing identical memory pages separately, the memory sharing agent 117A, 117N can identify these shared pages and store one copy of these memory pages that may be accessed by each VM 112A, 112N.

Memory sharing reduces the amount of memory required in the host when running VMs with shared memory. Thus, a virtualization system would benefit from a host selection algorithm optimized to schedule VMs 112A, 112N with high memory sharing on the same host machine 110A, 110N. Embodiments of the invention utilize a shared memory optimization based on hash-based calculations as one of the factors for migration agent 107 to consider in placement of a VM 112A, 112N on a host 110A, 110N during live migration of the VM.

Embodiments of the invention identify target host machines 110A, 110N that have a significant number of identical memory pages to a migrating VM 112A, 112N, and utilize this determination as part of the host selection algorithm for placing the migrating VM. Specifically, embodiments of the invention utilize hash-based calculations in determining identical shared memory pages between a migrating VM 112A, 112N and a candidate target host 110A, 110N. Embodiments of the invention use the hash-based shared memory determination as an additional consideration in the general host selection algorithm for migration.

The hash-based shared memory determination may be utilized in one or more of following ways: use the optimization on all candidate hosts, use the optimization on only the top X hosts as defined by the comparison ordering algorithm, use the optimization on only candidate hosts that have a scoring difference of no more than X (absolute) or Y percent from the best host, and raise the weight of shared memory optimizations in the host selection algorithm if the system is overall constrained by memory usage (e.g., average memory on all hosts, or X percent of hosts, is higher than Y percent memory utilization).

To start the migration process of embodiments of the invention, the migration agent initially becomes aware of a VM 112A, 112N to be migrated. In one embodiment, the migration agent may receive notification about the VM to be migrated. In other embodiments, the migration agent 107 may itself monitor the virtualization system 100 to identify when a VM 112A, 112N should be migrated. It is at this point that the migration agent 107 selects a host machine 110A, 110N to receive the migrating VM 112A, 112N by utilizing a general host selection algorithm.

As part of a host selection algorithm, the migration agent 107 calculates hash values for one or more of the memory pages of the migrating VM 112A, 112N. In one embodiment, all of the memory pages of the migrating VM 112A, 112N may be calculated. In another embodiment, only a portion of the pages of the migrating VM may be taken into account for hash-based calculations. In this case, the pages for hash-based calculations may be determined in multiple ways, including, but not limited to: using pages that did not change recently (more likely to be shared), and/or using pages that were accessed recently (more important pages are more likely to be accessed and shared). Reducing the number of pages for hash-based calculations in embodiments of the invention helps to speed up the process of embodiments of the invention.

In some embodiments, the hash values of the memory pages may already be calculated and stored in data storage pool 120 and/or in host controller 105. In one embodiment, a hash value for a memory page is calculated upon initialization of the memory page in the VM, which in many cases may be upon initialization of the VM itself.

The migration agent 107 then identifies candidate target host machines 110A, 110N capable of hosting the migrating VM 112A, 112N. In one embodiment, candidate target host machines include those host machines 110A, 110N that can launch a VM and provide all required resources for the VM, such as access to relevant storage and logical networks. For each of those candidate target host machines, the host selection algorithm obtains hash values of shared memory pages of VMs hosted by the candidate target host machine 110A, 110N. In some embodiments, the host selection algorithm utilizes the memory sharing agent 117A, 117N on each candidate host 110A, 110N to aid in obtaining the shared memory pages hash calculations.

Figure 2:
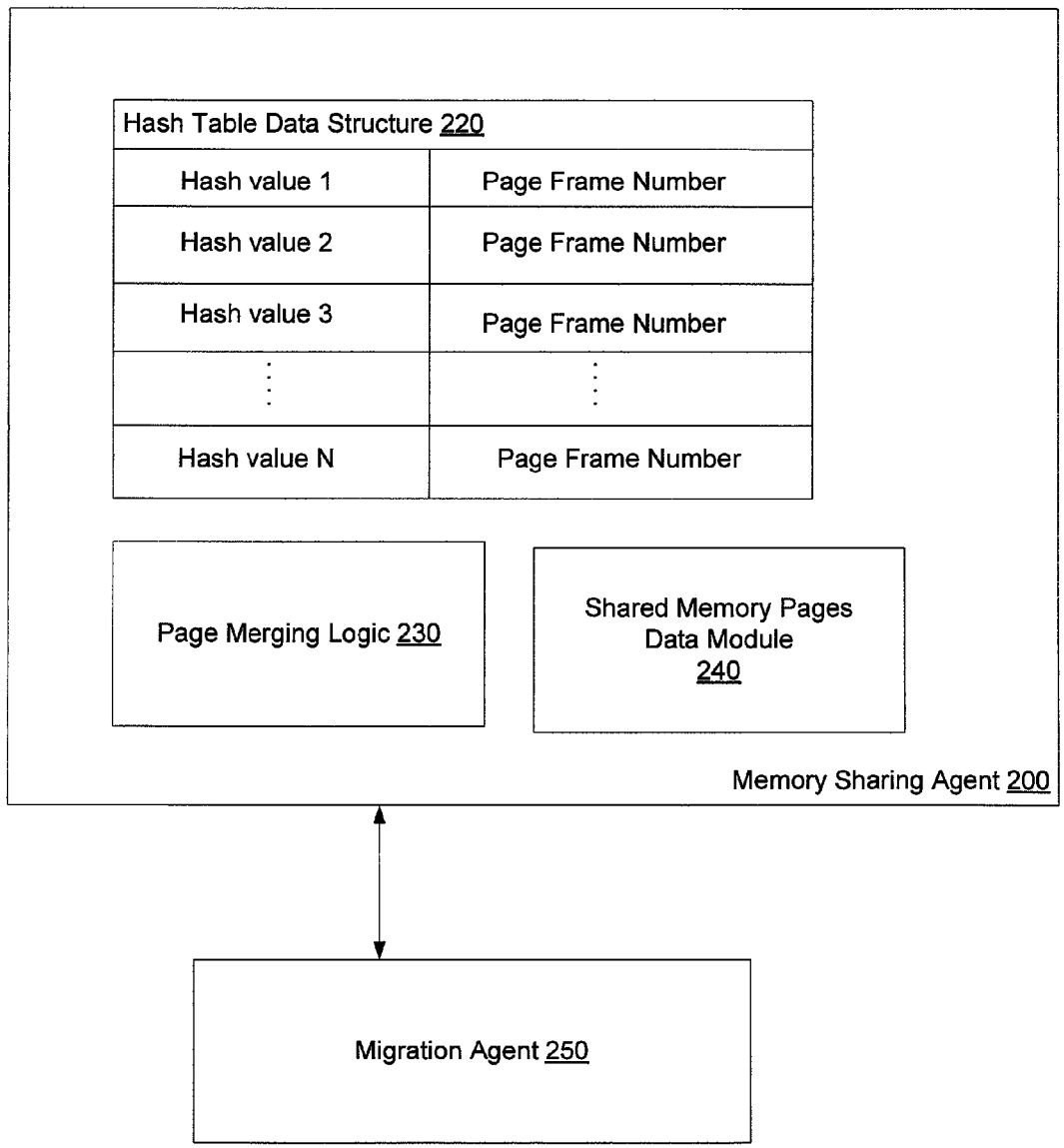
FIG. 2 is a block diagram of a memory sharing agent according to an embodiment of the invention.

FIG. 2 is a block diagram illustrating a closer view of a memory sharing agent utilized as part of the dynamic placement of VMs during live migration based on memory according to an embodiment of the invention. In one embodiment, memory sharing agent 200 is the same as memory sharing agent 117A, 117N described with respect to FIG. 1. As shown, memory sharing agent 200 is communicably coupled to migration agent 250. In one embodiment, migration agent 250 is the same a migration agent 107 described with respect to FIG. 1.

Memory sharing agent 200 includes a hash table data structure 220, page merging module 230, and shared memory pages data 240. The page merging logic 230 searches for and identifies identical memory pages of VMs associated with the memory sharing agent. The page merging logic 230 utilizes the hash table data structure 220 in order to find identical memory pages in an effective way. The hash table data structure 220 holds page frame numbers and is accessed by hash values of those pages. Utilizing the hash values, the merging logic 230 can identify identical memory pages and ensure that only one copy of that page is stored at a host machine, while also ensuring that disparate accesses to that memory page all are directed to the one single source of the memory page. In one embodiment, data about shared memory pages may be stored in a shared memory pages data module 240.

Returning to the discussion of the host selection algorithm of the migration agent 107, the algorithm can interact with the memory sharing agent 117A, 117N to determine shared memory pages of a particular candidate target host machine 110A, 110N. Specifically, memory sharing agent 117A, 117N provides hash values of the shared memory pages hosted in the candidate host machine 110A, 110N. The host selection algorithm can then compare the hash-based calculations of the memory pages of the migrating VM 112A, 11N to the hash calculations of the shared memory pages in each candidate target host machine 110A, 110N for matches. Those candidate target host machines 110A, 110N with the largest number of matching memory pages to the migrating VM's memory pages (based on the hash comparisons) is then given a higher score (based on weighting) in the host selection algorithm, thereby allowing for better memory utilization in the virtualization system 100. In some embodiments, the score for each candidate target host machine 110A, 110N is adjusted proportionally with the number of matching memory pages. For example, the candidate target host machine 110A, 110N with the most matching memory pages is given the highest score, and the candidate target host machine with the second most matches is given the second highest score, and so on.

Figure 3:
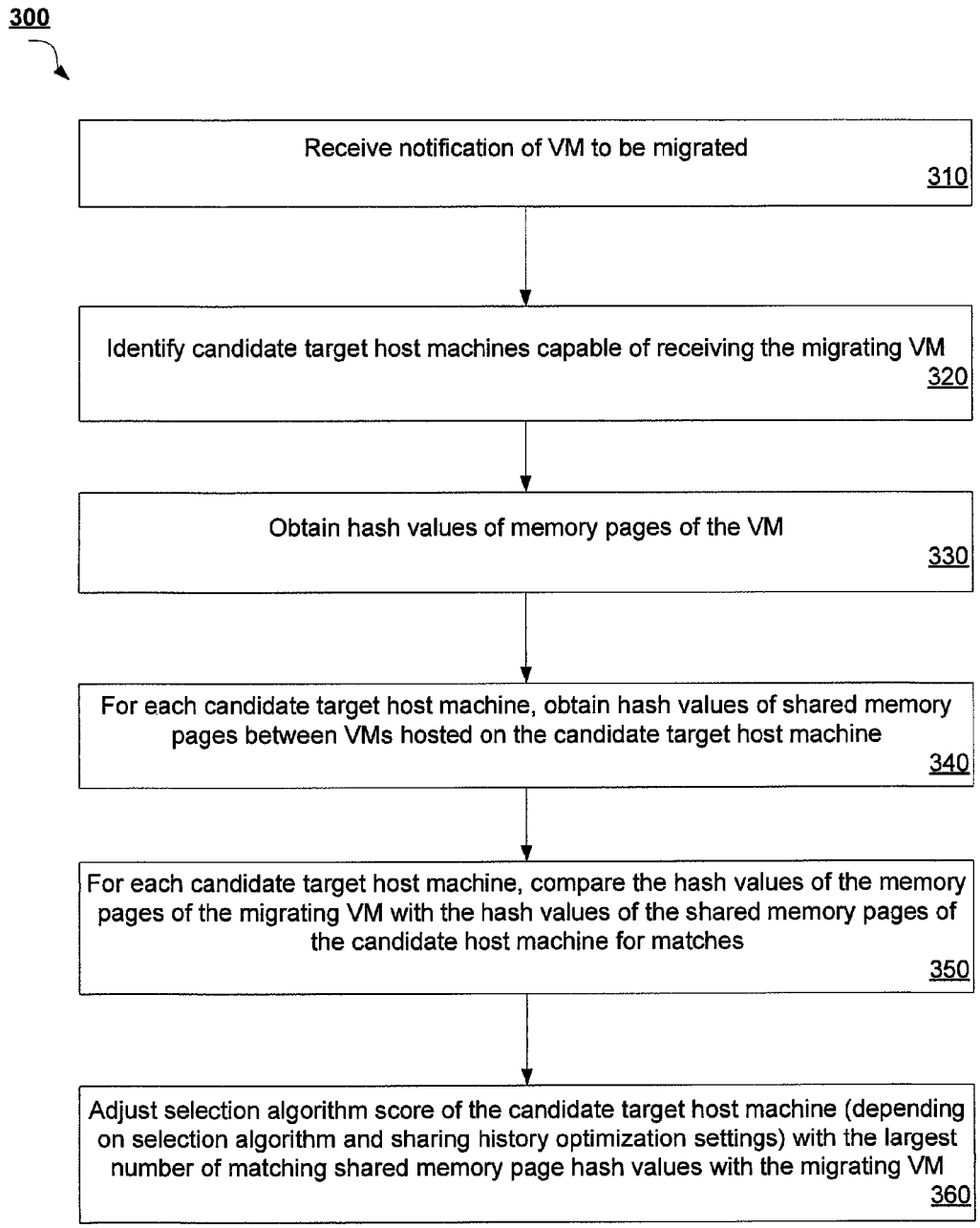
FIG. 3 is a flow diagram illustrating a method for dynamic placement of virtual machines (VMs) during live migration based on memory.

FIG. 3 is a flow diagram illustrating a method 300 for dynamic placement of virtual machines (VMs) during live migration based on memory according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by migration agent 107 described with respect to FIG. 1.

Method 300 begins at block 310 where notification of a VM to be migrated is received. Then, at block 320, candidate target host machines capable of receiving the migrating VM are identified. At block 330, hash values of memory pages of the migrating VM are obtained. In one embodiment, all of the memory pages of the migrating VM have their hash values calculated. In another embodiment, only those pages that have not changed recently have their hash values calculated. In yet another embodiment, only those pages that were accessed recently have their hash values calculated. The hash values may be obtained by any hashing algorithm known to one skilled in the art.

Subsequently, at block 340, for each candidate target host machine, hash values of shared memory pages used by VMs on the candidate target host machine are obtained. In one embodiment, the hash values of shared memory pages may be obtained by communicating with a memory sharing agent on the candidate target host machine. The memory sharing agent maintains the hash values of the shared memory pages and can provide this information to the host selection algorithm.

At block 350, for each candidate target host machine, the hash values of the memory pages of the migrating VM are compared for matches with the hash values of the shared memory pages of the candidate target host machine. At block 360, a selection algorithm score is adjusted for the candidate target host machine with the largest number of matching hash values to the migrating VM. In one embodiment, the adjustment of the selection score depends on the weight applied to the matching shared memory page hash value metric in the host selection algorithm. For instance, the host selection algorithm may put a higher weight on this metric when the system is overall memory constrained.

Figure 4:
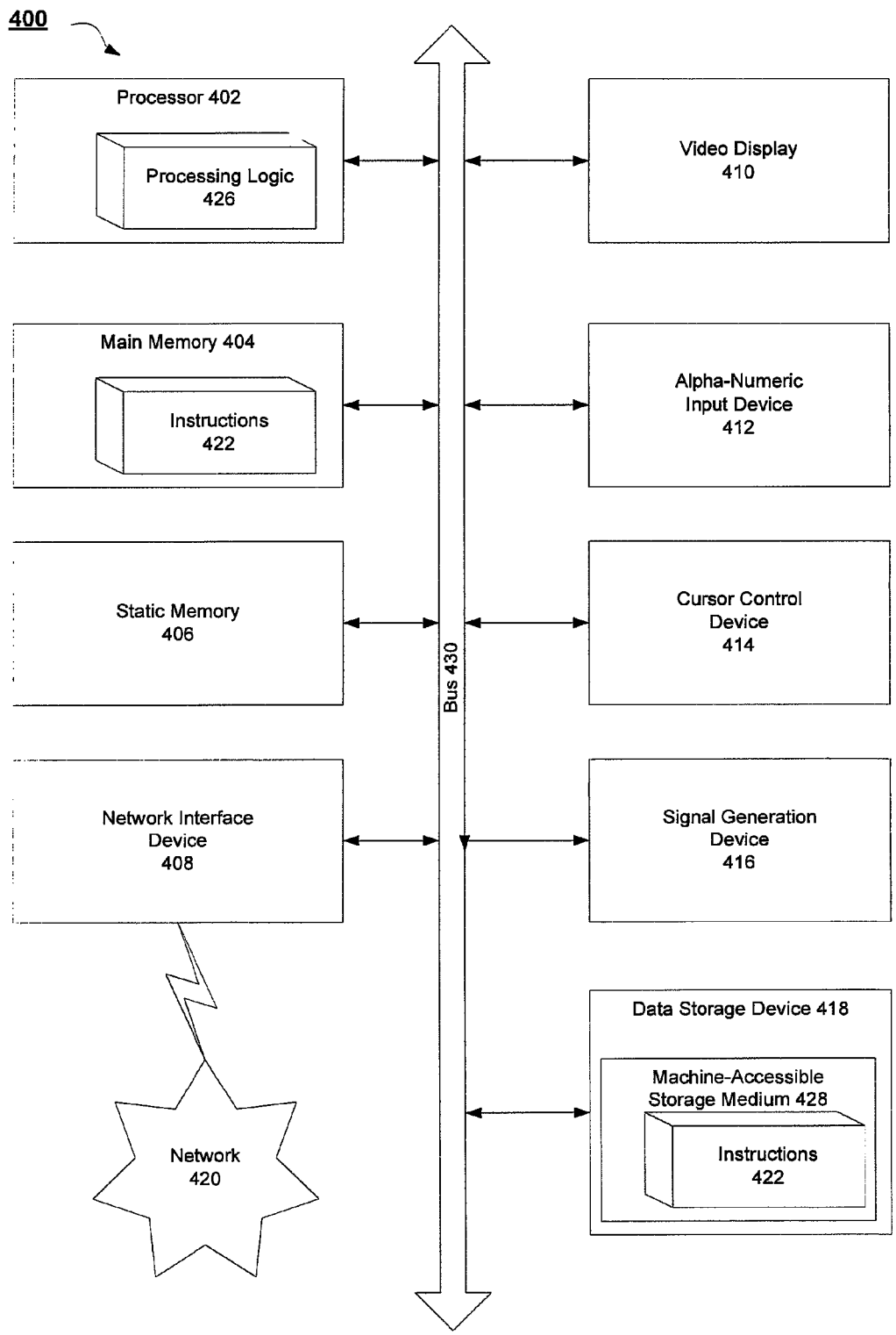
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform dynamic placement of VMs during live migration based on memory by a migration agent 107 as described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform dynamic placement of VMs during live migration based on memory of method 300 described with respect to FIG. 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   determining, by a host controller machine, candidate target host machines capable of receiving a virtual machine (VM) to be migrated;
   obtaining, by the host controller machine, hash values for memory pages of the VM to be migrated;
   obtaining, by the host controller machine for each of the determined candidate target host machines, hash values for shared memory pages utilized by one or more VMs hosted by the candidate target host machine;
   comparing, by the host controller machine for each of the determined candidate target host machine, the hash values for the memory pages of the VM to be migrated with the hash values for the shared memory pages of the candidate target host machine; and
   adjusting, by the host controller machine, a score in a general selection algorithm for the candidate target host machine with the most identical matches of the hash values for the shared memory pages with the hash values for the memory pages of the VM to be migrated.

2. The method of claim 1, wherein the hash values for the shared memory pages are maintained by a memory sharing agent at the candidate target host machine.

3. The method of claim 2, wherein obtaining the hash values for the shared memory pages further comprises contacting the shared memory agent to request the hash values for the shared memory pages.

4. The method of claim 2, wherein the memory sharing agent includes a hash table data structure that stores the hash values for the shared memory pages.

5. The method of claim 4, wherein the memory sharing agent includes a shared memory pages data module that stores data on which memory pages of the candidate target host machine are shared between VMs hosted by the candidate target host machine.

6. The method of claim 1, wherein comparing the hash values is performed between at least one of a top predetermined number or top predetermined percentage of candidate target host machines in terms of a current general score in the general selection algorithm.

7. The method of claim 1, wherein adjusting the score takes into consideration whether a system of the candidate hosts is overall memory constrained.

8. The method of claim 1, wherein the memory pages of the VM to be migrated includes at least one of all of the memory pages of the VM to be migrated, only those pages that have not changed in a predetermined time period, or only those pages that were accessed in another predetermined time period.

9. A system, comprising:
   a memory;
   a processing device communicably coupled to the memory; and
   a migration agent executed from the memory and the processing device, the migration agent configured to:
   determine candidate target host machines capable of receiving a virtual machine (VM) to be migrated;
   obtain hash values for memory pages of the VM to be migrated;
   obtain, for each of the determined candidate target host machines, hash values for shared memory pages utilized by one or more VMs hosted by the candidate target host machine;
   compare, for each of the determined candidate target host machine, the hash values for the memory pages of the VM to be migrated with the hash values for the shared memory pages of the candidate target host machine; and
   adjust a score in a general selection algorithm for the candidate target host machine with the most identical matches of the hash values for the shared memory pages with the hash values for the memory pages of the VM to be migrated.

10. The system of claim 9, wherein the hash values for the shared memory pages are maintained by a memory sharing agent at the candidate target host machine that includes a hash table data structure that stores the hash values for the shared memory pages.

11. The system of claim 10, wherein the memory sharing agent includes a hash table data structure that stores the hash values for the shared memory pages.

12. The system of claim 11, wherein the memory sharing agent includes a shared memory pages data module that stores data on which memory pages of the candidate target host machine are shared between VMs hosted by the candidate target host machine.

13. The system of claim 9, wherein the comparing the hash values is performed between at least one of a top predetermined number or top predetermined percentage of candidate target host machines in terms of a current general score in the general selection algorithm.

14. The system of claim 9, wherein the adjusting the score takes into consideration whether a system of the candidate hosts is overall memory constrained.

15. The system of claim 9, wherein the memory pages of the VM to be migrated includes at least one of all of the memory pages of the VM to be migrated, only those pages that have not changed in a predetermined time period, or only those pages that were accessed in another predetermined time period.

16. A non-transitory machine-readable storage medium including data that, when accessed by a machine, cause the machine to perform operations comprising:
   determining, by a host controller machine, candidate target host machines capable of receiving a virtual machine (VM) to be migrated;
   obtaining hash values for memory pages of the VM to be migrated;
   obtaining, for each of the determined candidate target host machines, hash values for shared memory pages utilized by one or more VMs hosted by the candidate target host machine;
   comparing, for each of the determined candidate target host machines, the hash values for the memory pages of the VM to be migrated with the hash values for the shared memory pages of the candidate target host machine; and
   adjusting a score in a general selection algorithm for the candidate target host machine with the most identical matches of the hash values for the shared memory pages with the hash values for the memory pages of the VM to be migrated.

17. The non-transitory machine-readable storage medium of claim 16, wherein the hash values for the shared memory pages are maintained by a memory sharing agent at the candidate target host machine that includes a hash table data structure that stores the hash values for the shared memory pages.

18. The non-transitory machine-readable storage medium of claim 16, wherein comparing the hash values isn performed between at least one of a top predetermined number or top predetermined percentage of candidate target host machines in terms of a current general score in the general selection algorithm.

19. The non-transitory machine-readable storage medium of claim 16, wherein adjusting the score takes into consideration whether a system of the candidate hosts is overall memory constrained.

20. The non-transitory machine-readable storage medium of claim 16, wherein the memory pages of the VM to be migrated includes at least one of all of the memory pages of the VM to be migrated, only those pages that have not changed in a predetermined time period, or only those pages that were accessed in another predetermined time period.

* * * * *